(12) United States Patent
Ryu et al.

(10) Patent No.: US 8,419,866 B2
(45) Date of Patent: Apr. 16, 2013

(54) METHOD OF MANUFACTURING TRANSITION METAL OXIDE HAVING SPINEL STRUCTURE

(75) Inventors: Takashi Ryu, Nagoya (JP); Toshiyuki Nakamura, Nagoya (JP); Makoto Ohmori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 581 days.

(21) Appl. No.: 12/694,516

(22) Filed: Jan. 27, 2010

(65) Prior Publication Data

US 2010/0193104 A1    Aug. 5, 2010

(30) Foreign Application Priority Data

Feb. 4, 2009   (JP) ................................ 2009-023956
Sep. 4, 2009   (JP) ................................ 2009-204489

(51) Int. Cl.
    *C23C 8/10*    (2006.01)
(52) U.S. Cl.
    USPC ........... 148/284; 148/276; 148/277; 148/286; 148/287; 429/463

(58) Field of Classification Search ............ 148/276, 148/277, 284, 286–287; 429/463
See application file for complete search history.

(56) References Cited

U.S. PATENT DOCUMENTS 5,340,783 A * 8/1994 Anderson et al. ............ 501/134
2007/0231593 A1   10/2007 Ryu et al.
2009/0011323 A1    1/2009 Guan et al.

FOREIGN PATENT DOCUMENTS

| JP | 2003-081641 A1 | 3/2003 |
| JP | 2005-050636 A1 | 2/2005 |
| JP | 2005-339904 A1 | 12/2005 |
| JP | 2007-265896 A1 | 10/2007 |
| JP | 2009-016351 A1 | 1/2009 |

* cited by examiner

*Primary Examiner* — Lois Zheng
(74) *Attorney, Agent, or Firm* — Burr & Brown (57) ABSTRACT

A novel method of manufacturing a transition metal oxide having a spinel structure is provided. A mixture of powdery metals of metal elements constituting the transition metal oxide is heated in an oxidizing atmosphere to generate the transition metal oxide.

7 Claims, 3 Drawing Sheets

METHOD OF MANUFACTURING TRANSITION METAL OXIDE HAVING SPINEL STRUCTURE

This application claims the benefits of Japanese Patent Applications P2009-23956 filed on Feb. 4, 2009 and P2009-204489 filed on Sep. 4, 2009, the entireties of which are incorporated by reference.

FIELD OF THE INVENTION

The present invention relates to a method of manufacturing a transition metal oxide having a spinel structure.

BACKGROUND OF THE INVENTION

To produce a solid electrolyte fuel cell stack structure by stacking separators and electrochemical cells alternately, it is necessary to supply a gas between the separator and the single cell so that fuel or oxidizing agent is supplied to electrodes of the single cell. At the same time, the single cell and the separator must be electrically connected in series by inserting a conductive connecting member (interconnector) between the separator and the single cell. When the above-described conductive connecting member is located in, for example, a fuel gas passage, it must be chemically stable in a reductive fuel gas at an operating temperature of the single cell. Further, there is required a gap through which the fuel gas can pass. For such reasons, so-called nickel felt has been commonly used as the connecting member in the fuel gas passage.

However, gas permeability is reduced in a state that the nickel felt is pressured, so that power generation efficiency tends to be lowered. The applicant has therefore disclosed that a metal mesh is embossed to form a protruding tongue piece and this tongue piece is pressed to the electrodes of the electrochemical cell to thereby realize the electrical conduction in Japanese Patent Laid-open Publication No. 2007-265896A. By doing so, it is possible to assure the gas permeability and make a press load onto an electrochemical cell uniform.

In the above-described stack structure, it is desired that an air electrode and fuel electrode of the cell and the conductive connecting member are bonded, whereby strength of the bonding portion is improved and the electrical conduction is stabilized. However, the conductive connecting member is normally made of a heat resistant metal having a high melting point, and the electrode is made of ceramics having relatively high electrical conductivity. In general, these heterogeneous materials are hard to be bonded together at a high mechanical strength at 1000° C. or lower.

For example, Japanese Patent Laid-open Publication No. 2005-339904A discloses that bonding between both of the interconnector and the cell is tried using conductive ceramics for the purpose of firmly bonding the interconnector and the cell. Specifically, La—Sr—Co—Fe-based perovskite-type complex oxide is used.

In addition, Japanese Patent Laid-open Publication No. 2005-050636A discloses that contact materials for the air electrode are formed using a mixture of silver powder/silver alloy and the perovskite-type complex oxide powder.

Further, Japanese Patent Laid-open Publication No. 2009-016351A discloses that a cathode composed of a manganese spinel compound is bonded to a metal interconnector using an adhesive agent composed of a manganese spinel compound as well (0029).

However, in the additive disclosed in Japanese Patent Laid-open Publication No. 2005-339904A, a heat treatment at a high temperature of 1000° C. or higher is required for the purpose of realizing sufficiently high strength. At the above-described high temperature, the metal interconnector is extremely oxidized, and therefore, the contact resistance is increased by the generation of chromia ($Cr_2O_3$). On the other hand, for the purpose of suppressing and preventing oxidation of the metal interconnector, when the heat treatment is performed, for example, at a temperature of 800 to 900° C., the bonding agent is not sufficiently sintered. Therefore, there is the possibility that the desired bonding strength is not obtained and a joining may be broken down during operation of the cell. In addition, the contact resistance is large due to the insufficient sintering of the bonding agent.

In the bonding agent disclosed in Japanese Patent Laid-open Publication No. 2005-050636A, the sintering property at a low temperature is improved and an increase in the resistance caused by oxidation of the metal interconnector can be suppressed. However, there is a problem that the cost is high, since silver is expensive.

Japanese Patent Laid-open Publication No. 2009-016351A discloses that a cathode composed of a manganese spinel compound is bonded to the metal interconnector using an adhesive agent composed of a manganese spinel compound as well; but there is not a specific example. In general, the manganese spinel compound is manufactured by mixing manganese oxide powder and cobalt oxide powder in a spinel ratio to sinter the mixture.

The present inventors have tried that the manganese spinel compound is generated between the cathode and the stainless steel interconnector to bond the cathode and the interconnector using the above-described manufacturing process. However, the inventors have found that the bonding strength between the cathode and the interconnector is low at the joint temperature of less than 1000° C., and moreover, the manufacturing variation in the bonding strength is large in the manufacturing process. When the variation in the bonding strength is increased during manufacturing, reliability in the joint is low and electrical conductivity is lost.

SUMMARY OF THE INVENTION

An object of the present invention is to provide a novel method of manufacturing a transition metal oxide having a spinel structure.

The present invention provides a method of manufacturing a transition metal oxide having a spinel crystal structure, the method comprising the step of:

heating a paste comprising a mixture of powdery materials of metals of elements constituting the transition metal oxide in an oxidizing atmosphere to generate the transition metal oxide.

According to the present invention, a new method of manufacturing a transition metal oxide having a spinel structure is provided. This method is a manufacturing process in which high strength is obtained through the heat treatment at a relatively low temperature, and moreover, variation in the strength is reduced. This is because, when metal powders are used as starting materials, a sintering progress of the powder can be accelerated by self-heating along with the oxidation reaction in the metal powder during the heat treatment at the solidification, and therefore, sufficient sintering can be performed at a low temperature.

Its oxidation starting temperature can be set to almost the same as the oxidation temperature of, for example, an adherend member (e.g., stainless steel), or a temperature lower than the oxidation temperature of the adherend member. In addition, the oxidation of a stainless steel member etc. can be suppressed to perform a low-temperature joining.

DETAILED DESCRIPTION OF THE INVENTION

An oxide having a spinel structure is an oxide generally represented by a composition formula of $AB_2O_4$. The oxide has two sites such as an A site and B site in the crystal. The crystal with a spinel structure is an isometric system, and a crystal with an octahedron.

Each metal element occupying the A site and/or the B site among the oxides each having a spinel structure is selected from any of transition metals. Herein, the transition metals preferably include chromium, manganese, iron, cobalt, nickel, copper and zinc.

Preferably, metal elements that occupy the A site and/or the B site are transition metals except for noble metals. More preferably, each metal element that indicates the A site and/or the B site is selected from the following metals.

A site: iron, manganese, cobalt, copper, nickel and zinc

B site: chromium, cobalt, manganese and iron

Most preferably, the metal element A is one or more metal elements selected from the group consisting of manganese, copper, nickel and zinc, and the metal element B is one or more metal elements selected from the group consisting of cobalt, manganese and iron.

Specifically, electrical conductivity of the transition metal oxide is preferably from 1 to 500 S/cm in a range of 700 to 1000° C.

When the transition metal oxide is manufactured, metal powder of the metal element A and that of the metal element B are mixed so as to be equal to a ratio of the spinel oxide to manufacture mixed powder, and this mixture is heated. A solvent and binder are added to this mixture to obtain paste, and this paste is more preferably heated. Further, the paste is inserted between the first member and the second member as prescribed, brought into contact with both of the members to thereby be subject to a heat treatment. This heat treatment enables the transition metal oxide having a spinel structure to be generated.

According to a preferred embodiment, a particle diameter of each metal powder is from 0.5 to 20 μm, respectively. As a result, strength of the generated transition metal oxide is more improved, and also, the electrical conductivity is more improved. From the above-described viewpoint, the particle diameter of each metal powder is more preferably from 0.8 to 15 μm.

From the viewpoint that the strength of the transition metal oxide is improved, the heating temperature is preferably 500° C. or higher, and more preferably 700° C. or higher at the time of the heat treatment. The upper limit of the heating temperature is preferably 1200° C. or lower from the viewpoint that excessive densification of the spinel bond is suppressed. Not only the bonding strength but also the maintenance of pores for supplying air may be required in the spinel bond. There is the possibility that when the transition metal oxide is sintered at an excessively high temperature, the spinel bond is densified, leading to an obstacle to the air supply. Further, as described below, when metal materials such as a metal separator and a conductive connecting member must be prevented from being oxidatively deteriorated, the heating temperature is preferably 980° C. or lower, and more preferably 900° C. or lower.

An atmosphere at the time of the heat treatment is set to an oxidizing atmosphere. For the oxidizing atmosphere, the atmosphere may be an air atmosphere, an oxygen atmosphere, or an atmosphere containing oxygen and an inert gas.

A binder, solvent, and other additive agents may be added to the paste, if needed. Further, a dispersant or plasticizer may be added to the paste.

As the above-described binder, methyl cellulose, ethyl cellulose, polyvinyl alcohol (PVA), and polyvinyl butyral (PVB) may be exemplified.

As the above-described solvent, ethanol, butanol, terpineol, acetone, xylene and toluene may be exemplified.

Molar ratios of the metal elements constituting the A site of the transition metal oxide, the metal elements constituting the B site of the transition metal oxide, and doped elements are determined according to a final composition as the respective target. The weight ratio of the binder in the paste is preferably from 1 to 20% by weight. Further, the weight ratio of the solvent in the paste is preferably from 2 to 30% by weight.

As a method of mixing the paste, a pot mill mixture, a pulverizer mixture, and a tri-roll mixture may be exemplified.

As raw materials, powder of the organic metal compound may be used. Examples of the raw materials include di-i-propoxy manganese (II) (chemical formula: $Mn(O-i-C_3H_7)_2$) in the case of manganese, di-i-propoxy cobalt (chemical formula: $Co(O-i-C_3H_7)_2$) in the case of cobalt, and bis(dipivaloylmetanate) copper (chemical formula: $Cu(C_{11}H_{19}O_2)_2$) in the case of copper.

(Objects to be Bonded)

The transition metal oxide according to the present invention is generated by heating a first member and a second member in the state where the paste is brought into contact with the members, and acts as a bonding agent for bonding the first member and the second member.

The first member and the second member may be metals, ceramics, or composite materials of metals and ceramics, and must be stable to the heat treatment atmosphere at least at the heat treatment temperature. The followings are particularly preferable. When the member is a metal, ferritic stainless steel, Inconel 600 and hastelloy may be disclosed as a heat-resistant metal. The ZMG material (trade name: Hitachi Metals, Ltd.) that is a heat-resistant alloy for the SOFC is particularly preferably used.

(Electrochemical Cell)

The electrochemical cell means a cell for performing an electrochemical reaction. Examples of the electrochemical cell include an oxygen pump and a high-temperature steam electrolytic cell. The high-temperature steam electrolytic cell can be used for a hydrogen production device and a steam removing device. Further, the electrochemical cell can be used as a decomposition cell for $NO_X$ and $SO_X$. This decomposition cell can be used for a purifying facility of exhaust gases from cars and generating equipments. In this case, oxygen in the exhaust gases through a solid electrolyte layer can be removed, and at the same time, $NO_X$ is electrochemically decomposed into nitrogen and oxygen to thereby remove also oxygen generated through this decomposition. Further, along with this process, steam in the exhaust gases is electrolyzed into hydrogen and oxygen, and this produced hydrogen reduces the $NO_X$ to $N_2$. Further, according to a preferred embodiment, a solid electrolyte fuel cell is used as the electrochemical cell.

A pair of electrodes each may be a cathode or an anode. Further, each of the one gas and the other gas may be a reducing gas or an oxidizing gas.

A material of the solid electrolyte layer is not particularly limited, and may be yttria stabilized zirconia or yttria partially stabilized zirconia. In the case of $NO_X$ decomposition cell, a cerium oxide is also preferable.

The anode material is preferably a perovskite-type complex oxide containing lanthanum, more preferably lanthanum manganite or lanthanum cobaltite, and most preferably lanthanum manganite. Into lanthanum cobaltite and lanthanum manganite, strontium, calcium, chromium, cobalt, iron, nickel and aluminum may be doped. Further, the anode materials may be palladium, platinum, ruthenium, platinum-zirconia cermet, palladium-zirconia cermet, ruthenium-zirconia cermet, platinum-cerium oxide cermet, palladium-cerium oxide cermet, ruthenium-cerium oxide cermet and the like.

As the cathode materials, nickel, palladium, platinum, nickel-zirconia cermet, platinum-zirconia cermet, palladium-zirconia cermet, nickel-cerium oxide cermet, platinum-cerium oxide cermet, palladium-cerium oxide cermet, ruthenium, ruthenium-zirconia cermet and the like are preferable.

Another separator may be sandwiched between the electrochemical cells. In this case, the material for a separator is not limited as far as it is stable with respect to the one gas and the other gas. The material may preferably be, for example, a perovskite-type complex oxide containing lanthanum, and more preferably lanthanum chromite. Further, in the case of a metallic separator, the material for the separator includes a nickel-based alloy such as Inconel, Nichrom or the like, a cobalt-based alloy such as Haynes alloy, and an iron-based alloy such as stainless steel. A material that is stable with respect to a reducing gas includes nickel and a nickel-based alloy.

(Conductive Connecting Member)

The material for the conductive connecting member is required to be stable with respect to a gas to which this member is exposed, at an operating temperature of the electrochemical cell. Specifically, preferable materials include platinum, silver, gold, palladium, a nickel-based alloy such as Inconel, Nichrom and the like, a cobalt-based alloy such as Haynes alloy and the like, an iron-based alloy such as stainless steel and the like, and nickel.

(Example of Stack)

A stack of an electrochemical cell to which the present invention is applied is not particularly limited. Herein, description will be made with reference to examples of FIGS. 1 and 2. An electrochemical cell 6 includes an air electrode 6c, a solid electrolyte 6b, and a fuel electrode 6a. The fuel electrode and the air electrode may be exchanged into each other. The cell 6 and the conductive connecting member 1 are sandwiched between a metallic interconnector 5A for air electrode and a metallic interconnector 5B for fuel electrode to thereby prepare a stack. A reference numeral 20 denotes a seal material. In addition, a structure of the air electrode and the fuel electrode may be a shape in which a plurality of layers having different compositions or consisting of different materials are stacked.

Figure 1:
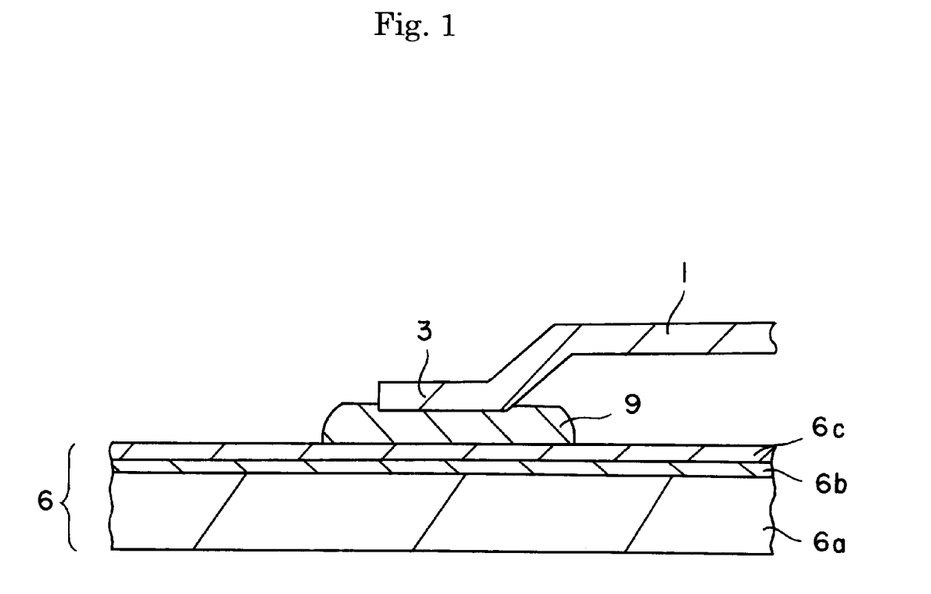
FIG. 1 is an enlarged cross-section view illustrating a joining of an electrode 6c of a cell 6 and an interconnector.

At this time, the conductive connecting member 1 with gas permeability is inserted between the interconnector 5A for air electrode and the cell 6 as well as between the interconnector 5B for fuel electrode and the cell 6, respectively. Further, as illustrated in FIG. 1, an end 3 of each conductive connecting member 1 is bonded to each of the electrodes 6a and 6c of the cell 6 using a bonding agent 9 according to the invention, whereby the conductive connecting member is fixed to the cell 6 to realize electrical conduction. As a method of assembling the stack, even a glass joint may be used.

(Manufacturing Process of Stack)

First, the electrochemical cell made of ceramics is manufactured. A manufacturing process of the cell is not particularly limited. Subsequently, the paste is placed between the electrodes of the cell 6 and the conductive connecting member 1 to bond both of them. Then, the cell 6 and the conductive connecting member 1 are sandwiched between the upper and lower interconnectors 5A and 5B, and pressed to form the stack. Subsequently, the stack is heated to reduce the fuel electrode under hydrogen atmosphere, and made to generate electric power. This pressing mechanism is not particularly limited, and may be, for example, a fastening member such as a bolt or the like, or a biasing mechanism such as a spring or the like.

At the stage of bonding the conductive connecting member 1 and the electrode 6a or 6c of the cell 6, the transition metal oxide is generated using the manufacturing process according to the present invention.

Specifically, metal powder of the metal element A and that of the metal element B are mixed so as to be equal to a ratio of the spinel oxide to produce mixed powder. The paste containing this mixed powder is inserted between the electrodes of the cell and the conductive connecting member 1, and brought into contact with both of them. When the heat treatment is performed in this state, the bonding agent 9 composed of a spinel type complex oxide is generated to bond the conductive connecting member and the cell electrode.

EXAMPLES

Experiment 1

Evaluation of Bonding Strength

Figure 3:
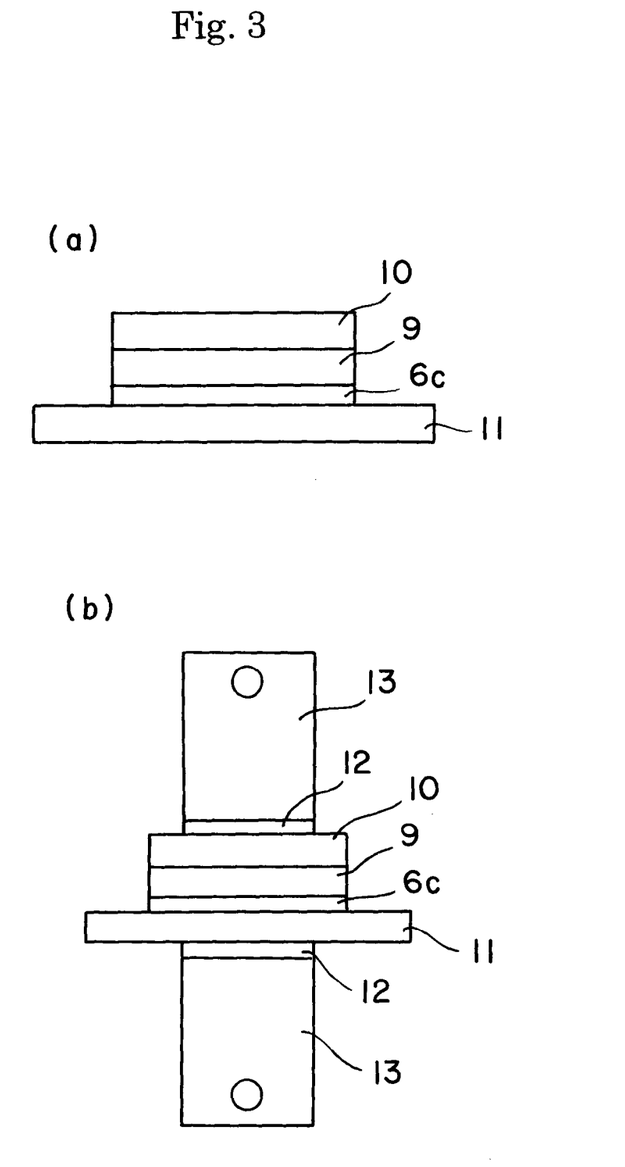
FIG. 3(a) is a front view illustrating a joining body of an air electrode disk and a metal disk.
FIG. 3(b) is a front view illustrating a measuring jig for the bonding strength using the joining body of FIG. 3(a).

The bonding strength to the cell electrode of the conductive bonding agents in the inventive example and the comparative example was evaluated by using an assembly illustrated in FIGS. 3(a) and 3(b).

(Preparation of Bonding Paste)

Oxide powder of the transition metal 1 and that of the transition metal 2 were weighed according to a molar ratio shown in the Table 1, and mixed and pulverized in a pot mill for 24 hours to obtain slurry. The obtained slurry was dried by an oven at 80° C., and then sintered for 1 hour at 800° C. in the air atmosphere to synthesize the spinel type complex oxide. The synthesized spinel was pulverized in the pot mill again to obtain the complex oxide powder with an average particle diameter of 0.5 p.m. To this powder, ethyl cellulose as the binder and terpineol as the solvent were added to prepare the bonding paste.

Further, metal powder of the transition metal 1 and that of the transition metal 2 were weighed in a molar ratio shown in the Table 1. To this powder, ethyl cellulose as the binder and terpineol as the solvent were added, and further the added powder was mixed using a mortar to prepare the bonding paste. In addition, examples of using the oxide powder as a starting material are represented in comparative examples 1 to 5, and examples of using the metal powder as a starting material are represented in inventive examples 1 to 5 (refer to Table 2).

TABLE 1

| Examples | Transition Metal 1 | Transition Metal 2 | Transition metal1: Transition metal 2 molar ratio | Chemical formula of spinel |
|---|---|---|---|---|
| 1 | Mn | Co | 1:2 | $MnCo_2O_4$ |
| 2 | Cu | Mn | 1:2 | $CuMn_2O_4$ |
| 3 | Ni | Mn | 1:2 | $NiMn_2O_4$ |
| 4 | Ni | Fe | 1:2 | $NiFe_2O_4$ |
| 5 | Zn | Fe | 1:2 | $ZnFe_2O_4$ |

According to a comparative example 6, ethyl cellulose as the binder and terpineol as the solvent were added to powder of $La_{0.6}Sr_{0.4}Cu_{0.2}Fe_{0.8}O_3$ having an average particle diameter of 0.5 μm to prepare the bonding paste. $La_{0.6}Sr_{0.4}Co_{0.2}Fe_{0.8}O_3$ is a material frequently used as that of the air electrode of the fuel cell, and a material sintered even at a relatively low temperature.

(Preparation of Air Electrode Disk for Test)

The $La_{0.75}Sr_{0.2}MnO_3$ used as the air electrode of the fuel cell is formed by uniaxial press, and sintered for 2 hours at 1200° C. in air to prepare a dense body. The obtained dense body was processed to a disk with a diameter of 20 mm and a thickness of 2 mm to prepare a disk 11 for test (refer to FIG. 3(a)).

For the purpose of simulating the real air electrode of the fuel cell, powder of $La_{0.75}Sr_{0.2}MnO_3$ with an average particle diameter of 0.5 μm and powder of 8 mol % yttria stabilized zirconia were mixed in a weight ratio of 1:1, and ethyl cellulose as the binder and terpineol as the solvent were added to the mixed powder to prepare paste. The obtained paste was printed in a diameter of 10 mm on a surface of the previously prepared air electrode disk, and sintered for 1 hour at 1200° C. in air to form a simulated air electrode 6c.

(Preparation of Metal Disk)

Ferritic stainless steel materials of high Cr content (22% Cr) were processed to a circular disk with a diameter of 10 mm and a thickness of 0.5 mm to prepare a metal disk 10.

(Preparation of Test Sample)

The bonding paste 9 was applied to surfaces of the air electrode 6c and metal disk 10 on the prepared air electrode disk 11, both of them was stuck together and dried for 1 hour at 100° C. Thereafter, both test pieces were sintered for 1 hour at 900° C. in air and bonded (refer to FIG. 3(a)).

(Evaluation)

Metal jigs 13 as illustrated in FIG. 3(b) were bonded to the air electrode disk 11 and the metal disk 10 using commercially available epoxy resin adhesive agent (TB2222P produced by Three Bond Co., Ltd.) 12, and the bonding strength of each joining body was found using a tensile test. Each joining body was tested for n=5, and an average value of the bonding strength was obtained. The results are represented in the Table 2. The Table 2 also represents the upper limit and lower limit of measured values in each example.

TABLE 2

| | Starting Materials | Average Strength (MPa) | Deviation of Strength (number of measurement: 5) |
|---|---|---|---|
| Comparative Example 1 | Metal oxide powder | 11 | 3~20 |
| Example 1 | Metal powder | 52 | 48~55 |
| Comparative Example 2 | Metal oxide Powder | 9 | 3~18 |
| Example 2 | Metal powder | 43 | 40~46 |
| Comparative Example 3 | Metal oxide Powder | 8 | 3~12 |
| Example 3 | Metal powder | 49 | 47~51 |
| Comparative Example 4 | Metal oxide powder | 9 | 1~15 |
| Example 4 | Metal powder | 41 | 38~45 |
| Comparative Example 5 | Metal oxide powder | 10 | 2~14 |
| Example 5 | Metal powder | 54 | 50~56 |
| Comparative Example 6 | — | 3.2 | 0~5 |

In the inventive examples 1 to 5 using various spinel materials, the bonding strength between the electrode and the metal is remarkably improved as compared with $La_{0.6}Sr_{0.4}Cu_{0.2}Fe_{0.8}O_3$ as the conventional perovskite materials. Specifically, the present invention proves that the metal interconnector and the electrode can be bonded more firmly. Moreover, it is confirmed that in the transition metal oxide according to the present invention, the variation in the strength is remarkably reduced as compared with that according to the comparative examples.

Experiment 2

Power Generation Test

Figure 2:
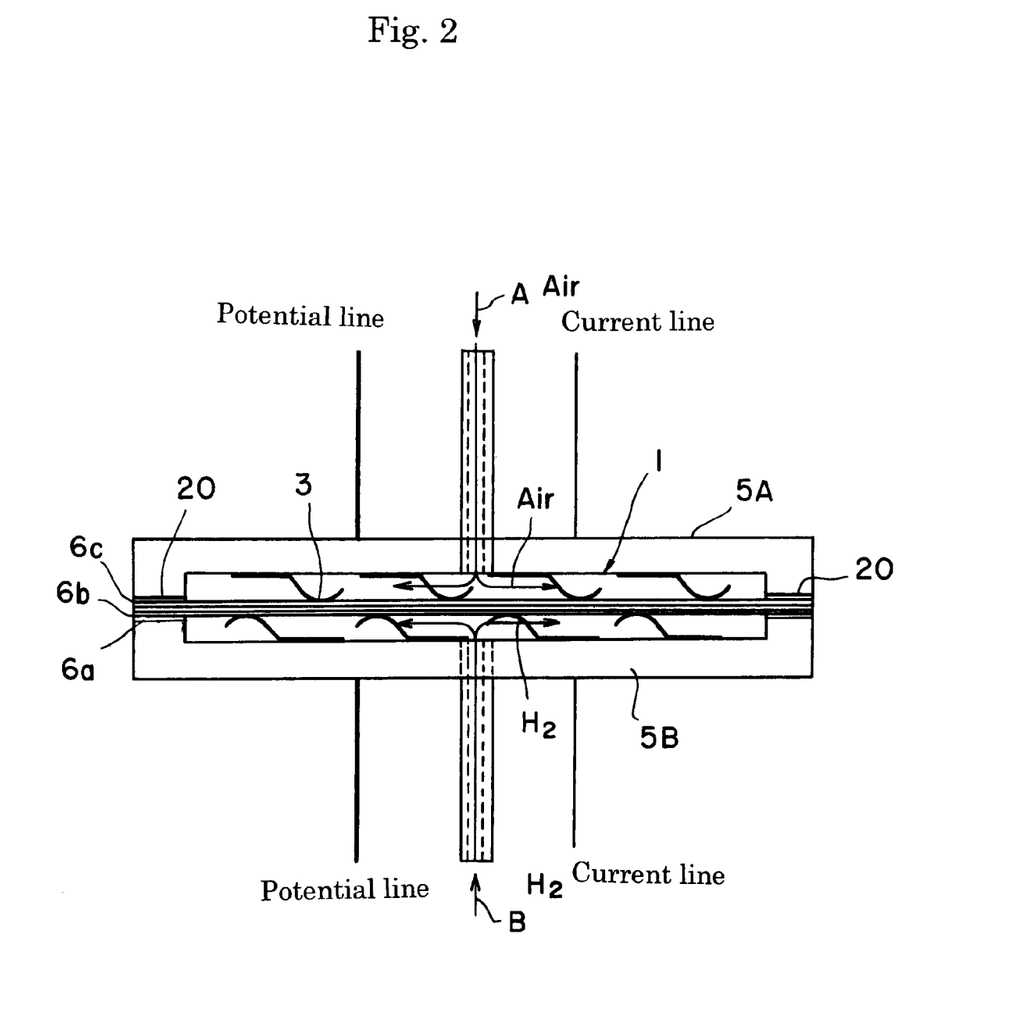
FIG. 2 is a schematic diagram illustrating a power generation device using an electrochemical cell.

A solid oxide fuel cell using the fuel electrode as a substrate was prepared as schematically illustrated in FIG. 2.

(Preparation of Fuel Electrode Substrate)

50 parts by weight of nickel oxide powder having an average particle diameter of 1 μm and 50 parts by weight of yttria-stabilized zirconia powder (8YSZ, "TZ-8Y": produced by Tosoh Corporation) were mixed, and polyvinyl alcohol (PVA) was added as the binder to prepare slurry. This slurry was dried and granulated with a spray drier to obtain powder for fuel electrode substrate. The granulated powder was molded by a metal mold pressing method to obtain a disk having a diameter of 120 mm and a thickness of 1.5 mm. Thereafter, the disk was sintered for 3 hours at 1400° C. in air in an electric furnace to obtain a fuel electrode substrate 6a.

(Formation of Solid Electrolyte Film)

Water and the binder were added to 8 mol % yttria-stabilized zirconia powder, and mixed in a ball mill for 16 hours. The thus obtained slurry was applied to the fuel electrode substrate described above, dried, and then sintered in an electric furnace in air at 1400° C. for 2 hours to prepare a laminated sintered bodies of the fuel electrode substrate and a solid electrolyte having a thickness of 10 μm.

(Formation of Air Electrode)

For preparing an air electrode, powder of $La_{0.75}Sr_{0.2}MnO_3$ having an average particle diameter of 0.5 μm and 8 mol % yttria-stabilized zirconia powder were mixed in a weight ratio of 1:1, and ethyl cellulose as the binder and terpineol as the solvent were added to the mixed powder to prepare paste. The paste was screen-printed, dried and fired at 1200° C. for 1 hour to prepare a cell 6 of the fuel electrode 6a, solid electrolyte 6b, and air electrode 6c.

(Preparation of Conductive Connecting Member)

As the conductive connecting member 1 having gas permeability, a Ni mesh was used in the side of the fuel electrode and a ferritic stainless steel mesh was used in the side of the air electrode. Each of the meshes was cut by laser processing to provide cuttings each having a shape of a tongue. Thereafter, the tongue piece was pressed to impart the protruded shape. The projection height of the tongue piece 3 was set to 1.0 mm for absorbing the warping of the cell.

(Bonding)

The joining paste according to the inventive example 1 was applied to an air electrode 6c surface of the prepared cell 6 and a tongue piece 3 of the conductive connecting member 1, and both of the air electrode 6c and the tongue pieces 3 were stuck together. Further, the joining paste according to the inventive example 1 was applied to also a surface of the interconnector 5A, and the conductive connecting member 1 was bonded to the interconnector 5A. Ni paste was applied to the fuel electrode 6a surface of the cell 6 and the interconnector 5B surface, and the fuel electrode 6a and the interconnector 5B were stuck together with the conductive connecting member 1 sandwiched therebetween. Thereafter, the respective portions described above were dried for 1 hour at 100° C., and then sintered for 1 hour at 900° C. in air and bonded to obtain a stack.

According to a comparative example, ethyl cellulose as the binder and terpineol as the solvent were added to powder of $La_{0.6}Sr_{0.4}Co_{0.2}Fe_{0.8}O_3$ having an average particle diameter of 0.5 μm to prepare the joining paste. Similarly, the respective portions were sintered for 1 hour at 900° C. in air, and bonded to obtain a stack.

(Evaluation of Performance)

The stack was set in an electric furnace for evaluating the performance. The temperature was elevated to 800° C. while nitrogen gas was flown in the side of the fuel electrode 6a and air was flown in the side of the air electrode 6c. When the temperature reached 800° C., hydrogen gas was flown in the side of the fuel electrode 6a to perform the reduction process. After performing the reduction process for 3 hours, the evaluation of current-voltage characteristic and analysis of the internal resistance relating to the stack was performed at 800° C.

As a result, in one stack using the conductive bonding agent according to the present invention, the maximum output density was 0.31 $W/cm^2$, and the ohmic resistance was 0.30 $\Omega \cdot cm^2$. On the other hand, in another stack according to the comparative example, the maximum output density was 0.10 $W/cm^2$, and the ohmic resistance was 2.0 $S\Omega \cdot cm^2$.

In the present invention, the following is proved as compared with $La_{0.6}Sr_{0.4}Cu_{0.2}Fe_{0.8}O_3$ as the conventional perovskite materials. That is, the metal interconnector and the electrode can be bonded more firmly, and further, power generation output can be improved and internal ohmic resistance can be reduced.

Experiment 3

Average Particle Diameter and Characteristics of Material Metal Powder

In this experiment, an investigation relating to average particle diameters of Mn metal powder and Co metal powder was performed in the case of $MnCo_2O_4$.

As shown in the Table 3, the bonding agent was adjusted by combining various particle diameters so as to have a spinel composition.

Specifically, particle diameters of the metal manganese powder and the cobalt powder were changed as shown in the Table 3. The manganese powder and the cobalt powder were mixed in a molar ratio of 1:2. To this mixed powder, ethyl cellulose as the binder and terpineol as the solvent were added, and the added powder was mixed using a mortar to prepare the paste. This paste was dried for 1 hour at 100° C. Thereafter, the paste was sintered for 1 hour at 900° C. in air.

The paste of each example was applied to a surface of the air electrode 6c on the air electrode disk 11 and a surface of the metal disk 10 prepared in the inventive example 1. Further, both of the air electrode 6c and the metal disk 10 were stuck together and dried for 1 hour at 100° C. Thereafter, both test pieces were sintered for 1 hour at 900° C. in air and bonded (refer to FIG. 3(a)). Then, the bonding strength was measured.

TABLE 3

| Particle diameter of Mn powder (um) | Particle diameter of Co powder (um) | Joining strength (MPa) |
|---|---|---|
| 0.3 | 0.3 | 32 |
| 0.5 | 0.5 | 63 |
| 1.2 | 0.5 | 55 |
| 2.0 | 1.0 | 57 |
| 2.0 | 3.0 | 52 |
| 1.0 | 5.0 | 54 |
| 7.5 | 3.0 | 60 |
| 12 | 3.0 | 47 |
| 5.0 | 15.0 | 45 |
| 20 | 20 | 40 |
| 5.0 | 30 | 22 |
| 28 | 5.0 | 18 |

As shown in the result of the Table 3, an average particle diameter of each powder is preferably from 0.5 to 20 μm, and more preferably from 0.8 to 15 μm.

| 1: | interconnector |
| 6: | electrochemical cell |
| 6a, 6c: | electrode |
| 6b: | solid electrolyte |
| 9: | bonding agent |
| 10: | metal disk |
| 11: | air electrode disk |

The invention claimed is:

1. A method of manufacturing a transition metal oxide having a spinel crystal structure, the method comprising the steps of:
   mixing a plurality of powders of transition metal elements constituting the transition metal oxide to obtain a mixture of powdery metals; and
   heating the mixture of powdery metals in an oxidizing atmosphere to solidify and oxidize the mixture by powder sintering to thereby generate the transition metal oxide having a spinel crystal structure.

2. The method of claim 1, wherein the mixture comprises a paste further comprising a solvent and a binder.

3. The method of claim 1, wherein the transition metal oxide comprises a main phase having a composition formula of $AB_2O_4$, wherein A is one or more metal elements selected from the group consisting of iron, manganese, cobalt, copper, nickel and zinc, and B is one or more metal elements selected from the group consisting of chromium, cobalt, manganese and iron.

4. The method of claim 3, wherein A is one or more metal elements selected from the group consisting of manganese, copper, nickel and zinc, and wherein B is one or more metal elements selected from the group consisting of cobalt, manganese and iron.

5. The method of claim 1, wherein the powdery metals have particle diameters of 0.5 to 20 μm, respectively.

6. The method of claim 1, further comprising the step of:
inserting the mixture between a first member and a second member;
wherein the mixture is heated in the oxidizing atmosphere to generate the transition metal oxide to thereby bond the first and second members.

7. The method of claim 6, wherein the first member comprises an electrode provided on a solid electrolyte, and the second member comprises a conductive connecting member electrically connected to the electrode.

* * * * *

UNITED STATES PATENT AND TRADEMARK OFFICE
CERTIFICATE OF CORRECTION

PATENT NO. : 8,419,866 B2
APPLICATION NO. : 12/694516
DATED : April 16, 2013
INVENTOR(S) : Takashi Ryu, Toshiyuki Nakamura and Makoto Ohmori It is certified that error appears in the above-identified patent and that said Letters Patent is hereby corrected as shown below:

<u>On the Title Page, Item (56), References Cited</u>

Please add: "OTHER DOCUMENTS" O.A. Fouad, et al., "*Growth and Characterization of ZnO, $SnO_2$ an $ZnO/SnO_2$ Nanostructures from the Vapor Phase,*" Topics in Catalysis, Vol. 47, No. 1-2, February 6, 2008, pp. 84-96."

Signed and Sealed this
Second Day of July, 2013

Teresa Stanek Rea
*Acting Director of the United States Patent and Trademark Office*